United States Patent
Kuroda et al.

(10) Patent No.: US 8,632,438 B2
(45) Date of Patent: Jan. 21, 2014

(54) HYBRID VEHICLE DRIVING SYSTEM

(75) Inventors: Shigetaka Kuroda, Saitama (JP); Shinji Fujimoto, Saitama (JP); Takefumi Ikegami, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/579,186

(22) PCT Filed: Mar. 31, 2011

(86) PCT No.: PCT/JP2011/058362
§ 371 (c)(1),
(2), (4) Date: Aug. 15, 2012

(87) PCT Pub. No.: WO2011/125915
PCT Pub. Date: Oct. 13, 2011

(65) Prior Publication Data
US 2012/0322603 A1 Dec. 20, 2012

(30) Foreign Application Priority Data
Mar. 31, 2010 (JP) .................................. 2010-081006

(51) Int. Cl.
*B60W 10/08* (2006.01)
(52) U.S. Cl.
USPC ........................................................... 477/5
(58) Field of Classification Search
USPC .............................................. 477/5; 701/22
See application file for complete search history.

(56) References Cited

U.S. PATENT DOCUMENTS

| 2007/0107960 A1 | 5/2007 | Takami et al. | |
|---|---|---|---|
| 2012/0245781 A1* | 9/2012 | Kanamori et al. | 701/22 |
| 2012/0259496 A1* | 10/2012 | Ikegami | 701/22 |

FOREIGN PATENT DOCUMENTS

| JP | 2002-089594 A | 3/2002 |
|---|---|---|
| JP | 2005-265167 A | 9/2005 |
| JP | 2007-283878 A | 11/2007 |
| JP | 2009-511328 A | 3/2009 |
| JP | 2009-090781 A | 4/2009 |
| JP | 2009-202712 A | 9/2009 |
| JP | 2010/064551 A | 3/2010 |
| WO | 2007/049720 A1 | 5/2007 |

OTHER PUBLICATIONS

International Search Report of PCT/JP2011/058362, mailing date of Jun. 28, 2011.

* cited by examiner

*Primary Examiner* — Dirk Wright
(74) *Attorney, Agent, or Firm* — Westerman, Hattori, Daniels & Adrian, LLP (57) ABSTRACT

The present invention provides a hybrid vehicle driving system which can implement sufficient lubrication while a vehicle is being driven. A hybrid vehicle driving system 1 of the invention includes a lubrication pump 122 which is connected to a first input shaft 11 and which is adapted to lubricate a transmission 20 and a lubricated state determination unit 55 which determines a lubricated state of the transmission 20. When the lubricated state determination unit 55 determines that lubrication is necessary, the first input shaft 11 is rotated by an electric motor 7 so as to drive the lubrication pump 122, or the first input shaft 11 is rotated by an internal combustion engine 6 by engaging a first engaging and disengaging unit to thereby drive the lubrication pump 122.

12 Claims, 9 Drawing Sheets

HYBRID VEHICLE DRIVING SYSTEM

TECHNICAL FIELD

The present invention relates to a hybrid vehicle driving system.

BACKGROUND ART

There have conventionally been known vehicle driving systems which include an internal combustion engine, an electric motor and auxiliaries such as an air conditioner compressor and a lubrication pump (for example, refer to Patent Literature 1).

Figure 9:
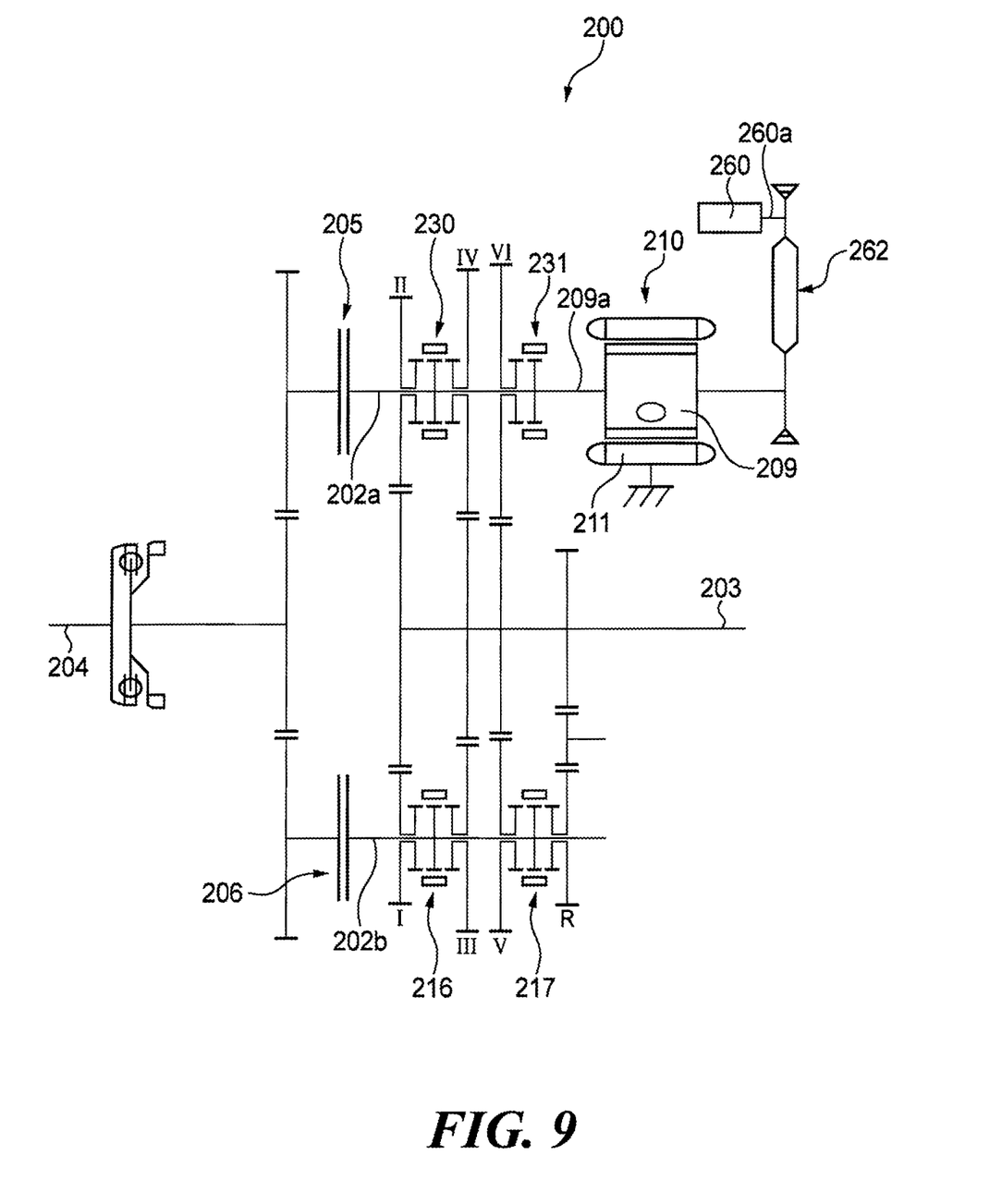
FIG. 9 schematically shows a vehicle driving system of Patent Literature 1.

A vehicle driving system 200 of Patent Literature 1 includes, as shown in FIG. 9, a dual-clutch type transmission mechanism which includes: a first input shaft 202a which is connected to an electric motor 210 and which is selectively connected to an internal combustion engine output shaft 204 by a first engaging and disengaging means 205; a second input shaft 202b which is selectively connected to the internal combustion engine output shaft 204 by a second engaging and disengaging means 206; an output shaft 203 which outputs power to a driven portion; a first gear train including plural gears which are electively connected to the first input shaft 202a via first synchromesh units 230, 231 which are disposed on the first input shaft 202a; a second gear train including plural gears which are selectively connected to the second input shaft 202b via second synchromesh units 216, 217 which are disposed on the second input shaft 202b; and a third gear train which is disposed on the output shaft 203 and which includes plural gears which mesh with the gears of the first gear train and the gears of the second gear train. The electric motor 210 includes a rotor 209 which has a rotor shaft 209a and a stator 211. In this vehicle driving system 200, an auxiliary 260 such as a lubrication pump or the like is connected to the rotor shaft 209a via a belt unit 262.

RELATED ART LITERATURE

Patent Literature

Patent Literature 1: JP-2002-089594-A

SUMMARY OF THE INVENTION

Problems to be Solved by the Invention

In the vehicle driving system 200, torque is transmitted to an output shaft, not shown, by way of the first input shaft 202a or the second input shaft 202b by connecting selectively at least one of the first engaging and disengaging means 205 and the second engaging and disengaging means 206 to the internal combustion engine output shaft to thereby drive the vehicle. In this vehicle driving system 200, when the neutral position or the gear to which the motor is not connected is kept selected by the driver while the vehicle is driven, at least the second engaging and disengaging means 206 is disengaged, and therefore, the second input shaft 202b does not rotate, whereby the vehicle is coasting. In this case, the lubrication pump 206 which is provided on the second input shaft 206b is also not driven. Since no lubrication is implemented, the vehicle driving system 200 may be heated to a high temperature.

The invention has been made in view of above, and an object thereof is to provide a hybrid vehicle driving system which enables sufficient lubrication to be implemented at all times while a hybrid vehicle is being driven.

Means for Solving the Problems

Claim 1 provides a hybrid vehicle driving system to be used in a hybrid vehicle which utilizes an internal combustion engine (e.g., an internal combustion engine 6 in embodiment) and an electric motor (e.g., an electric motor 7 in embodiment) as drive sources, the hybrid vehicle driving system including:
a transmission (e.g., a transmission 20 in embodiment) having:
  a first transmission mechanism in which mechanical driving force from an output shaft of the internal combustion engine and the electric motor is received by a first input shaft (e.g., a first main shaft 11 in embodiment) which is in engagement with the electric motor so as to put any of plural gears (e.g., a third speed drive gear pair 23, a fifth speed gear pair 25, a seventh speed gear pair 97 in embodiment) in an engaged state to thereby bring the first input shaft and driving wheels into engagement with each other;
  a second transmission mechanism in which the mechanical driving force from the output shaft of the internal combustion engine is received by a second input shaft (e.g., a second intermediate shaft 16 in embodiment) so as to put any of plural gears (e.g., a second speed gear pair 22, a fourth speed gear pair 24, a sixth speed gear pair 96 in embodiment) in an engaged state to thereby bring the second input shaft and the driving wheels into engagement with each other;
  a first engaging and disengaging unit (e.g., a first clutch 41 in embodiment) which can bring the output shaft of the internal combustion engine and the first input shaft into engagement with each other; and
  a second engaging and disengaging unit (e.g., a second clutch 42 in embodiment) which can bring the output shaft of the internal combustion engine and the second input shaft into engagement with each other,
  a lubrication pump (e.g., a lubrication pump 122 in embodiment) which is connected to the first input shaft to thereby implement the lubrication of the transmission; and
  a lubricated state determination unit (e.g., a lubricated state determination unit 55 in embodiment) which determines a lubricated state of the transmission,
  wherein, when the lubricated state determination unit determines that lubrication is necessary, the lubrication pump is driven by rotating the first input shaft by the electric motor, or the lubrication pump is driven by rotating the first input shaft by the internal combustion engine by engaging the first engaging and disengaging unit.

Claim 2 provides, based on claim 1, the hybrid vehicle driving system, further including:
a shift position detection unit (e.g., a shift position detection unit 57 in embodiment) which detects a shift position selected by the user,
wherein the transmission further has:
a first synchromesh unit (e.g., a synchromesh mechanism 61, a first gear change shifter 51 in embodiment) which puts any of the plural gears in an engaged state so as to bring the first input shaft and the driving wheels into engagement with each other; and
a second synchromesh unit (e.g., a second gear change shifter 52 in embodiment) which puts any of the plural gears in an engaged state so as to bring the second input shaft and the driving wheels into engagement with each other, wherein, when a neutral position is selected while the vehicle is being driven, the first engaging and disengaging unit, the second engaging and disengaging unit, the first synchromesh unit and the second synchromesh unit are disengaged, and thereafter, the lubricated state of the transmission is determined by the lubricated state determination unit, and wherein, when the lubricated state determination unit determines that lubrication is necessary, the first input shaft is rotated by the electric motor to thereby drive the lubrication pump, or the first input shaft is rotated by the internal combustion engine by engaging the first engaging and disengaging unit to thereby drive the lubrication pump.

Claim 3 provides, based on claim 2, the hybrid vehicle driving system, further including:

a third speed gear for a third speed which is provided on the first input shaft so as to be rotated in association with rotation of an output shaft (e.g., a counter shaft 14 in embodiment) which transmits power to the driving wheels, wherein a revolution speed of the third speed gear is calculated based on a vehicle speed of the vehicle which is being driven, so that the first input shaft is rotated at the same revolution speed as the revolution speed of the third speed gear.

Claim 4 provides, based on claim 1, the hybrid vehicle driving system, wherein, when the lubricated state determination unit determines that lubrication is necessary while the vehicle is being driven in any of the plural gears provided on the second input shaft, the gear is pre-shifted to any of the plural gears which are provided on the first input shaft.

Claim 5 provides, based on claim 1, the hybrid vehicle driving system, wherein the electric motor can be cooled by driving the lubrication pump.

Claim 6 provides, based on claim 1, the hybrid vehicle driving system, wherein, while the vehicle is being driven in any of the plural gears which are provided on the second input shaft, the gear is pre-shifted to any of the plural gears which are provided on the first input shaft so as to rotate the first input shaft to thereby drive the lubrication pump.

Claim 7 provides, based on any one of claims 1 to 6, the hybrid vehicle driving system, further including:

an air conditioner (e.g., an air conditioner compressor 112 in embodiment) which can be driven by the first input shaft.

Advantage of the Invention

According to the invention of claim 1, even in the hybrid vehicle which includes the double-clutch type transmission in which the lubrication pump is provided only on one of the transmission shafts, the lubricated state of the transmission can be maintained well. When no lubrication is necessary, the lubrication pump is not driven, whereby the wasteful energy consumption by driving the auxiliary can be suppressed.

According to the invention of claim 2, even when the neutral position is selected while the vehicle is being driven, the lubrication pump can be driven by rotating the first input shaft, and therefore, the lubricated state can be maintained well. Additionally, the state of the lubrication pump can be evaluated with the neutral position selected.

According to the invention of claim 3, the friction is reduced by causing the first input shaft to rotate at the same revolution speed as the revolution speed of the third speed gear, thereby improving the durability of the transmission.

According to the invention of claim 4, even when the vehicle is being driven in any of the plural gears which are provided on the second input shaft, the revolution speed of the first input shaft can easily be caused to coincide with the revolution speed of the gear on the first input shaft which is selected through pre-shifting.

According to the invention of claim 5, the electric motor can also be cooled in addition to the lubrication of the transmission.

According to the invention of claim 6, when the vehicle is being driven in any of the plural gears which are provided on the second input shaft, the lubrication pump can be driven by rotating the first input shaft, and therefore, the lubricated state of the transmission can be maintained well.

According to the invention of claim 7, in addition to the lubrication of the transmission, the air conditioner can be driven by the lubrication pump by rotating the first input shaft, and therefore, even when the vehicle is being driven in any of the plural gears which are provided on the second input shaft, air conditioning can be implemented.

MODE FOR CARRYING OUT THE INVENTION

Hybrid vehicle driving systems according to embodiments of the invention will be described by reference to the drawings. The drawings are assumed to be seen in a direction in which reference numerals given therein look normally.
(First Embodiment)

Hereinafter, a hybrid vehicle driving system 1 according to a first embodiment of the invention (hereinafter, referred to as a vehicle driving system) will be described by reference to FIGS. 1 and 2.

Figure 1:
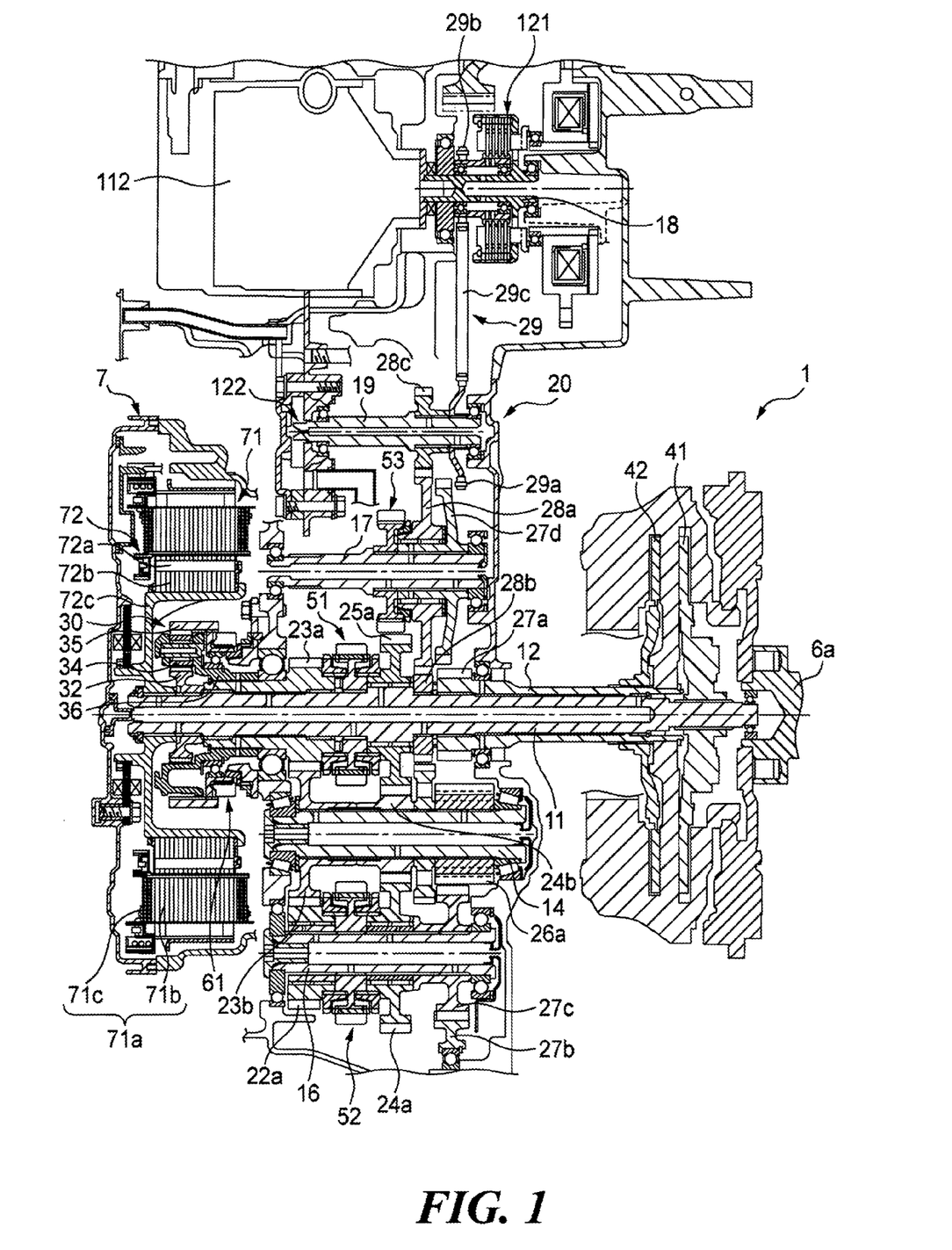
FIG. 1 cross-sectionally shows a hybrid vehicle driving system according to a first embodiment of the invention.
Figure 2:
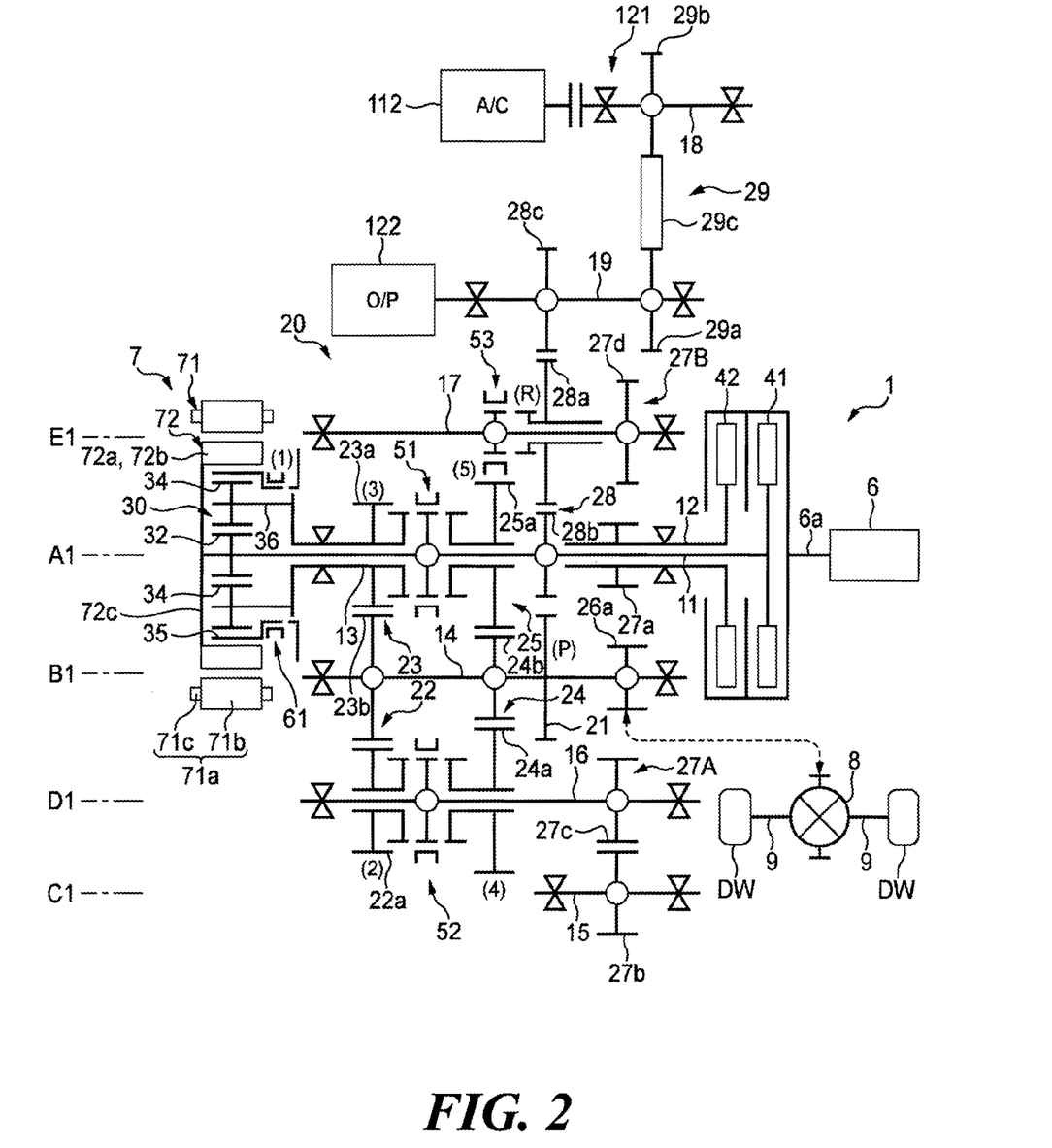
FIG. 2 schematically shows the hybrid vehicle driving system of FIG. 1.

As shown in FIGS. 1 and 2, the hybrid vehicle driving system 1 is designed to drive driving wheels DW, DW (a driven portion) of a vehicle (not shown) via drive shafts 9, 9 thereof and includes an internal combustion engine (hereinafter, referred to as an "engine") 6 which is a drive source, an electric motor (hereinafter, referred to as a "motor") 7, and a transmission 20 for transmitting power to the driving wheels DW, DW.

The engine 6 is a gasoline engine or a diesel engine, and a first clutch 41 (a first engaging and disengaging means) and a second clutch (a second engaging and disengaging means) 42 of the transmission 20 are provided on a crankshaft 6a of the engine 6.

The motor 7 is a three-phase, brushless DC motor and has a stator 71 which includes 3n armatures 71a and a rotor 72 which is disposed so as to face the stator 71. The armatures 71a each include an iron core 71b and a coil 71c which is wound around the iron core 71b and are fixed to a casing, not shown, so as to be aligned about a rotating shaft at substantially equal intervals in a circumferential direction. 3n coils 71c make up n sets of coils of three phases; a U phase, a V phase and a W phase.

The rotor 72 has an iron core 72a and n permanent magnets 72b which are aligned about a rotating shaft at substantially equal intervals, and any two permanent magnets 72b which lie adjacent to each other have different polarities. A fixing portion 72c which fixes the iron core 72a in place has a hollow cylindrical shape, is disposed on an outer circumferential side of a ring gear 35 of a planetary gear mechanism 30, which will be described later, and is connected to a sun gear 32 of the planetary gear mechanism 30. By so doing, the rotor 72 is made to rotate together with the sun gear 32 of the planetary gear mechanism 30.

The planetary gear mechanism 30 has the sun gear 32, the ring gear 35 which is disposed concentrically with the sun gear 32 and which is disposed so as to surround the periphery of the sun gear 32, planetary gears 34 which are made to mesh with the sun gear 32 and the ring gear 35, and a carrier 36 which supports the planetary gears 34, allowing them to revolve on their own axes and roll "walk" around the sun gear 32. In this way, the sun gear 32, the ring gear 35 and the carrier 36 are made to rotate differentially relative to each other.

A synchromesh mechanism 61 (a lock mechanism), which has a synchromesh mechanism (a synchronizer mechanism) and which is adapted to stop (lock) the rotation of the ring gear 35, is provided on the ring gear 35. A brake mechanism may be used in place of the synchromesh mechanism 61.

The transmission 20 is a so-called double-clutch type transmission which includes the first clutch 41, the second clutch 42 and the planetary gear mechanism 30, which have already been described, as well as plural change-speed gear trains, which will be described later.

More specifically, the transmission 20 includes a first main shaft 11 (a first input shaft) which is disposed coaxially with a crankshaft 6a of the engine 6 (a rotational axis A1), a second main shaft 12, a connecting shaft 13, a counter shaft 14 (an output shaft) which can rotate about a rotational axis B1 which is disposed parallel to the rotational axis A1. The transmission 20 includes a first intermediate shaft 15 which can rotate about a rotational axis C1 which is disposed parallel to the rotational axis A1, a second intermediate shaft 16 (a second input shaft) which can rotate about a rotational axis D1 which is disposed parallel to the rotational axis A1, and a reverse shaft 17 which can rotate about a rotational axis E1 which is disposed parallel to the rotational axis A1.

The first clutch 41 is provided at an end of the first main shaft 11 which faces the engine 6, while the sun gear 32 of the planetary gear mechanism 30 and the rotor 72 of the motor 7 are mounted at an opposite end of the first main shaft 11 to the end which faces the engine 6. Consequently, the first main shaft 11 is selectively connected to the crankshaft 6a of the engine 6 by the first clutch 41 and is connected directly to the motor 7 so that power of the engine 6 and/or the motor 7 is transmitted to the sun gear 32.

The second main shaft 12 is formed shorter than the first main shaft 11 and hollow and is disposed rotatably relative to the first main shaft 11 so as to cover the periphery of a portion of the first main shaft 11 which lies closer to the engine 6. The second clutch 42 is provided at an end of the second main shaft 12 which faces the engine 6 and an idle drive gear 27a is mounted integrally on the second main shaft 12 at an opposite end to the end which faces the engine 6. Consequently, the second main shaft 12 is selectively connected to the crankshaft 6a of the engine 6 by the second clutch 42 so that power of the engine 6 is transmitted to the idle drive gear 27a.

The connecting shaft 13 is formed shorter than the first main shaft 11 and hollow and is disposed rotatably relative to the first main shaft 11 so as to cover the periphery of a portion of the first main shaft 11 which lies opposite to the engine 6. A third speed drive gear 23a is mounted integrally on the connecting shaft 13 at an end which faces the engine 6, and the carrier 36 of the planetary gear mechanism 30 is mounted integrally on the connecting shaft 13 at an end which lies opposite to the end which faces the engine 6. Consequently, by the revolution of the planetary gears 34, the carrier 36 and the third speed drive gear 23a which are mounted on the connecting shaft 13 are made to rotate together.

A fifth speed drive gear 25a is provided on the first main shaft 11 between the third speed drive gear 23a mounted on the connecting shaft 13 and the idle drive gear 27a mounted on the second main shaft 12 so as to rotate relative to the first main shaft 11, and a reverse driven gear 28b, which rotates together with the first main shaft 11, is mounted on the first main shaft 11. A first gear change shifter 51, which connects the first main shaft 11 with the third speed drive gear 23a or the fifth speed drive gear 25a and releases the connection therebetween, is provided between the third speed drive gear 23a and the fifth speed drive gear 25a. When the first gear change shifter 51 is engaged in a third speed engaging position, the first main shaft 11 and the third speed drive gear 23a are connected together to rotate together. When the first gear change shifter 51 is engaged in a fifth speed engaging position, the first main shaft 11 and the fifth speed drive gear 25a rotate together. When the first gear change shifter 51 is in a neutral position, the first main shaft 11 rotates relative to the third speed drive gear 23a and the fifth speed drive gear 25a. When the first main shaft 11 and the third speed drive gear 23a rotate together, the sun gear 32 which is mounted on the first main shaft 11 and the carrier 36 which is connected to the third speed drive gear 23a by the connecting shaft 13 rotate together, and the ring gear 35 also rotates together, whereby the planetary gear mechanism 30 is made integral.

A first idle driven gear 27b, which is adapted to mesh with the idle drive gear 27a which is mounted on the second main shaft 12, is mounted on the first intermediate shaft 15.

A second idle driven gear 27c, which is adapted to mesh with the first idle driven gear 27b which is mounted on the first intermediate shaft 15, is mounted on the second intermediate shaft 16. The second idle driven gear 27c makes up a first idle gear train 27A together with the idle drive gear 27a and the first idle driven gear 27b. A second speed drive gear 22a and a fourth speed drive gear 24a, which are adapted to rotate relative to the second intermediate shaft 16, are provided on the second intermediate shaft 16 in such positions that the second speed drive gear 22a and the fourth speed drive gear 24a face the third speed drive gear 23a and the fifth speed drive gear 25a, respectively, which are provided around the first main shaft 11. A second gear change shifter 52, which is adapted to connect the second intermediate shaft 16 with the second speed drive gear 22a or the fourth speed drive gear 24a or release the connection of the shaft with the drive gear, is provided between the second speed drive gear 22a and the fourth speed drive gear 24a on the second intermediate shaft 16. Then, when the second gear change shifter 52 is engaged in a second speed engaging position, the second intermediate shaft 16 and the second speed drive gear 22a rotate together. When the second gear change shifter 52 is engaged in a fourth speed engaging position, the second intermediate shaft 16 and the fourth speed drive gear 24a rotate together. When the second gear change shifter 52 is in a neutral position, the second intermediate shaft 16 rotates relative to the second speed drive gear 22a and the fourth speed drive gear 24a.

A first common driven gear 23b, a second common driven gear 24b, a park gear 21 and a final gear 26a are mounted integrally on the counter shaft 14 sequentially in that order from an opposite end of the counter shaft 14 to an end which faces the engine 6.

Here, the first common driven gear 23b meshes with the third speed drive gear 23a which is mounted on the connecting shaft 13 to thereby make up a third speed gear pair 23 together with the third speed drive gear 23a. In addition, the first common driven gear 23b meshes with the second speed drive gear 22a which is provided on the second intermediate shaft 16 to thereby make up a second speed gear pair 22 together with the second speed drive gear 22a.

The second common driven gear 24b meshes with the fifth speed drive gear 25a which is provided on the first main shaft 11 to thereby make up a fifth speed gear pair 25 together with the fifth speed drive gear 25a. In addition, the second common driven gear 24b meshes with the fourth speed drive gear 24a which is mounted on the second intermediate shaft 16 to thereby make up a fourth speed gear pair 24 together with the fourth speed drive gear 24a.

The final gear 26a meshes with a differential gear mechanism 8, and the differential gear mechanism 8 is connected to the driving wheels DW, DW via the drive shafts 9, 9. Consequently, power transmitted to the counter shaft 14 is outputted from the final gear 26a to the driving wheels DW, DW through the differential gear mechanism 8 and the drive shafts 9, 9.

A third idle driven gear 27d, which is adapted to mesh with the first idle driven gear 27b mounted on the first intermediate shaft 15, is mounted integrally on the reverse shaft 17. The third idle driven gear 27d makes up a second idle gear train 27B together with the idle drive gear 27a and the first idle driven gear 27b. A reverse drive gear 28a, which is adapted to mesh with the reverse driven gear 28b which is mounted on the first main shaft 11, is provided on the reverse shaft 17 so as to rotate relative to the reverse shaft 17. The reverse drive gear 28a makes up a reverse gear train 28 together with the reverse driven gear 28b. Further, a reverse shifter 53, which is adapted to connect the reverse shaft 17 with the reverse drive gear 28a or release the connection of the shaft with the drive gear, is provided on an opposite side of the reverse drive gear 28a to a side facing the engine 6. Then, when the reverse shifter 53 is engaged in a reverse engaging position, the reverse shaft 17 and the reverse drive gear 28a rotate together. When the reverse shifter 53 is in a neutral position, the reverse shaft 17 and the reverse drive gear 28a rotate relative to each other.

The first gear change shifter 51, the second gear change shifter 52 and the reverse shifter 53 utilize a clutch mechanism which has a synchromesh mechanism (a synchronizer mechanism) which makes rotational speeds of the shaft and the gear which are connected together coincide with each other.

In the above-described transmission 20, an odd-numbered gear train (a first gear train) which is made up of the third speed drive gear 23a and the fifth speed drive gear 25a is provided on the first main shaft 11 which is one transmission shaft of the two transmission shafts. In addition, an even-numbered gear train (a second gear train) which is made up of the second speed drive gear 22a and the fourth speed drive gear 24a is provided on the second intermediate shaft 16 which is the other transmission shaft of the two transmission shafts.

The vehicle driving system 1 further includes an air conditioner compressor 112 and an oil pump 122. The oil pump 122 is mounted on an oil pump auxiliary shaft 19 which is disposed parallel to the rotational axes A1 to E1 so as to rotate together with the oil pump auxiliary shaft 19. An oil pump driven gear 28c, which is adapted to mesh with the reverse drive gear 28a, and an air conditioner drive gear 29a are provided on the oil pump auxiliary shaft 19 so as to rotate together, so that power of the engine 6 and/or the motor 7 which rotates the first main shaft 11 is transmitted thereto. The oil pump 122 can lubricate the transmission 20 and can also cool the motor 7 by use of a feed pump and piping which are not shown. By so doing, a lubricant of the oil pump 122 is commonly used for both lubrication and cooling. The oil pump 122 can be driven in consideration of an increase in temperature of the rotor 72 or the stator 71 of the motor 7 resulting from the oil pump 122 being not used for a long period of time.

The air conditioner compressor 112 is provided on an air conditioner auxiliary shaft 18 which is disposed parallel to the rotational axes A1 to E1 via an air conditioner clutch 121. An air conditioner driven gear 29b, to which power is transmitted from the air conditioner drive gear 29a via a chain 29c, is mounted on the air conditioner auxiliary shaft 18 so as to rotate together with the air conditioner auxiliary shaft 18, so that power of the engine 6 and/or the motor 7 is transmitted from the oil pump auxiliary shaft 19 to the air conditioner compressor 112 via an air conditioner transmission mechanism 29 which is made up of the air conditioner drive gear 29a, the change 29c and the air conditioner driven gear 29b. The air conditioner compressor 112 is designed so as to cut off the transmission of power by disengaging the air conditioner clutch 121 by an air conditioner operating solenoid, not shown.

The above-described hybrid vehicle driving system 1 of this embodiment is allowed to have the following first to fifth transmission lines.

(1) A first transmission line is a transmission line in which the crankshaft 6a of the engine 6 is connected to the driving wheels DW, DW via the first main shaft 11, the planetary gear mechanism 30, the connecting shaft 13, the third speed gear pair 23 (the third speed drive gear 23a, the first common driven gear 23b), the counter shaft 14, the final gear 26a, the differential gear mechanism 8, and the drive shafts 9, 9. Here, a reduction ratio of the planetary gear mechanism 30 is set so that an engine torque transmitted to the driving wheels DW, DW via the first transmission line corresponds to a first speed. Namely, the reduction ratio of the planetary gear mechanism 30 is set so that a reduction ratio resulting when the reduction ratio of the planetary gear mechanism 30 is multiplied by a reduction ratio of the third speed gear pair 23 corresponds to the first speed.

(2) A second transmission line is a transmission line in which the crankshaft 6a of the engine 6 is connected to the driving wheels DW, DW via the second main shaft 12, the first idle gear train 27A (the idle drive gear 27a, the first idle driven gear 27b, the second idle driven gear 27c), the second intermediate shaft 16, the second speed gear pair 22 (the second speed drive gear 22a, the first common driven gear 23b) or the fourth speed gear pair 24 (the fourth speed drive gear 24a, the second common driven gear 24b), the counter shaft 14, the final gear 26a, the differential gear mechanism 8, and the drive shafts 9, 9.

(3) A third transmission line is a transmission line in which the crankshaft 6a of the engine 6 is connected to the driving wheels DW, DW via the first main shaft 11, the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8, and the drive shafts 9, 9 without involving the planetary gear mechanism 30 along the transmission line.

(4) A fourth transmission line is a transmission line in which the motor 7 is connected to the driving wheels DW, DW via the planetary gear mechanism 30 or the third speed gear pair 23 (the third speed drive gear 23a, the first common driven gear 23b) or the fifth speed gear pair 25 (the fifth speed drive gear 25a, the second common driven gear 24b), the counter shaft 14, the final gear 26a, the differential gear mechanism 8, and the drive shafts 9, 9.

(5) A fifth transmission line is a transmission line in which the crankshaft 6a of the engine 6 is connected to the driving wheels DW, DW via the second main shaft 12, the second idle gear train 27B (the idle drive gear 27a, the first idle driven gear 27b, the third idle driven gear 27d), the reverse shaft 17, the reverse gear train 28 (the reverse drive gear 28a, the reverse driven gear 28b), the planetary gear mechanism 30, the connecting shaft 13, the third speed gear pair 23 (the third speed drive gear 23a, the first common driven gear 23b), the counter shaft 14, the final gear 26a, the differential gear mechanism 8, and the drive shafts 9, 9.

Figure 3:
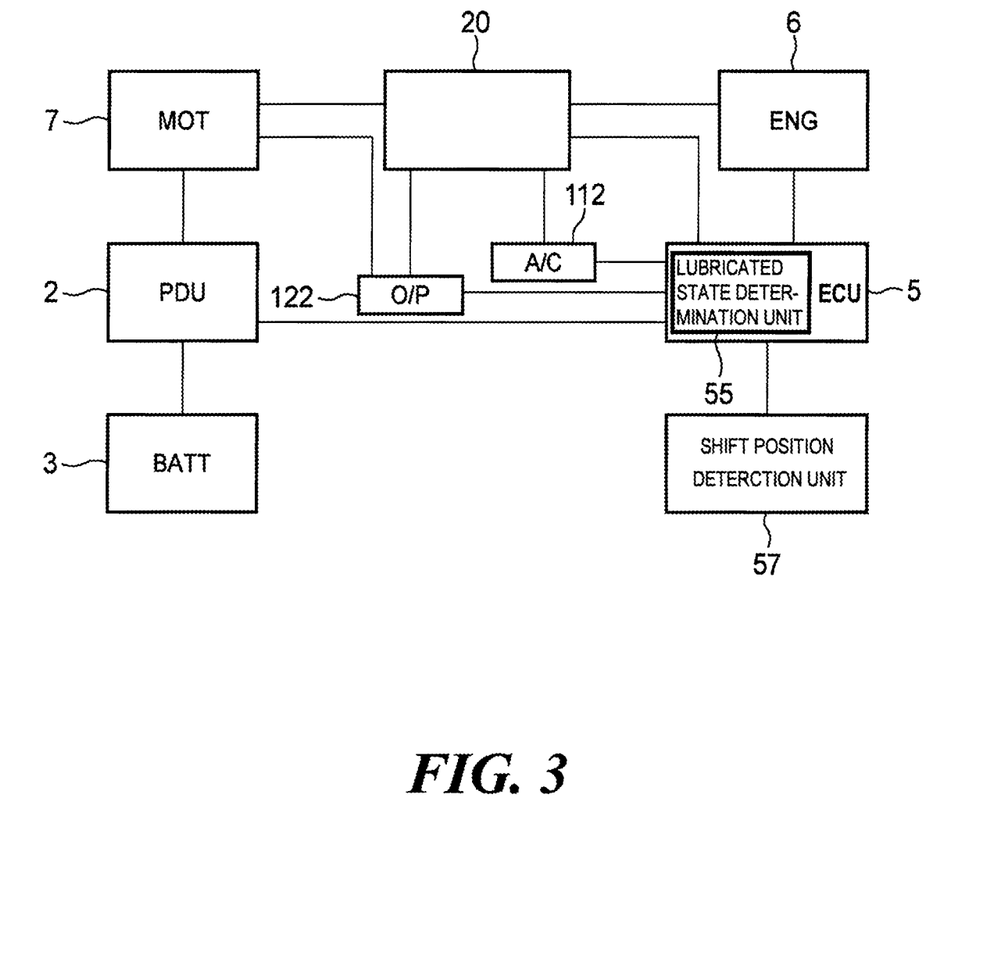
FIG. 3 shows a control system of the hybrid vehicle driving system of FIG. 1.

As shown in FIG. 3, in the hybrid vehicle driving system 1 of this embodiment, the motor 7 is connected to a power control unit (hereinafter, referred to as PDU) 2 which controls the operation of the motor 7. The PDU 2 is connected to a battery 3 which supplies electric power to the motor 7 or electric power from the motor 7 is stored. The motor 7 is driven by electric power supplied thereto from the battery 3 via the PDU 2. The motor 7 can regenerate electric power by the rotation of the driving wheels DW, DW during deceleration traveling or by driving of the engine 6 to charge the battery 3 (energy regeneration). The PDU 2 is connected to an electronic control unit (hereinafter, referred to as ECU) 5. The ECU 5 is a control unit for controlling various operations of the vehicle in whole and is connected with a shift position detection unit 57 which detects the current shift position.

The ECU 5 includes a lubricated state determination unit 55 which determines a lubricated state of the transmission 20. Inputted into the ECU 5 are acceleration request, braking request, engine revolution speed, motor revolution speed, revolving speeds of the first and second main shafts 11, 12, revolving speed of the counter shaft 14, vehicle speed, gear range, shift position, state of charge of the battery 3 (SOC: State of Charge) and the like. Then, outputted from the ECU 5 are signals that control the engine 6, signals that control the motor 7, signals signaling the generation, charge and discharge states of the battery 3, signals that control the first and second gear change shifters 51, 52 and the reverse shifter 53, signals that control the application (lock) and release (neutral) of the synchromesh mechanism 61, output signals that control the application and release of the air conditioner clutch 121, and the like.

In the above-described hybrid vehicle driving system 1, first to fifth speed drivings and a reverse driving can be implemented by the engine 6 by controlling the engagement and disengagement of the first and second clutches 41, 42 and the engaging positions of the first gear change shifter 51, the second gear change shifter 52 and the reverse shifter 53.

In the first speed driving, the first clutch 41 is applied, and the synchromesh mechanism 61 is engaged, whereby the driving force is transmitted to the driving wheels DW, DW via the first transmission line. In the second speed driving, the second clutch 42 is applied, and the second gear change shifter 52 is engaged in the second speed engaging position, whereby the driving force is transmitted to the driving wheels DW, DW via the second transmission line. In the third speed driving, the first clutch 41 is applied, and the first gear change shifter 51 is engaged in the third speed engaging position, whereby the driving force is transmitted to the driving wheels DW, DW via the third transmission line.

In the fourth speed driving, the second gear change shifter 52 is engaged in the fourth speed engaging position, whereby the driving force is transmitted to the driving wheels DW, DW via the second transmission line. In the fifth speed driving, the first gear change shifter 51 is engaged in the fifth speed engaging position, whereby the driving force is transmitted to the driving wheels DW, DW via the second transmission line. The second clutch 42 is applied and the reverse shifter 53 is engaged, whereby the reverse driving is implemented by way of the fifth transmission line.

The synchromesh mechanism 61 is engaged or the first and second gear change shifters 51, 52 are pre-shifted during an engine driving, whereby the motor 7 is allowed to assist the engine driving or to implement the regeneration. Further, even when the engine is idling, the motor 7 is allowed to assist the engine 6 or to charge the battery 3. Furthermore, the first and second clutches 41, 41 are released, whereby an EV driving can be enabled by the motor 7. As driving modes of the EV driving, there exist a first speed EV mode in which the first and second clutches 41, 42 are released and the synchromesh mechanism 61 is engaged, whereby the vehicle is allowed to be driven by way of the fourth transmission line, a third speed EV mode in which the first gear change shifter 51 is engaged in the third speed engaging position, whereby the vehicle is allowed to be driven by way of the fourth transmission line, and a fifth speed EV mode in which the first gear change shifter 51 is engaged in the fifth speed engaging position, whereby the vehicle is allowed to be driven by way of the fourth transmission line.

In this way, according to the hybrid vehicle driving system 1 of this embodiment, the vehicle can be driven in the various driving modes by controlling the application and release of the first clutch 41 and the second clutch 42 and the engaging positions of the synchromesh mechanism 61, the first gear change shifter 51, the second gear change shifter 52 and the reverse shifter 53 in response to a request from or operation performed by the driver.

When the driving conditions require the vehicle to be kept driven in an even-numbered gear and hence no pre-shift of an odd-numbered gear is implemented or when the neutral position is selected as a result of the driver changing gear, even while the vehicle is being driven, the first clutch 41, the synchromesh mechanism 61, the first gear change shifter 51, and the reverse shifter 53 are released. As a result, the driving force from the engine 6 or the motor 7 is not transmitted to the driving wheels DW, DW, and the vehicle continues to run with the odd-numbered gears stopped.

In this way, when the vehicle is kept driven in an even-numbered gear and hence no pre-shift of an odd-numbered gear is implemented or when the neutral position is selected while the vehicle is being driven and the first clutch 41, the second clutch 42, the synchromesh mechanism 61, the first gear change shifter 51, the second gear change shifter 52 and the reverse shifter 53 are all released, the first main shaft 11, the second main shaft 12, the first intermediate shaft 15, the second intermediate shaft 16 and the reverse shaft 17 are not driven by the engine 6 or the motor 7 and hence do not rotate.

Since the air conditioner auxiliary shaft 18 and the oil pump auxiliary shaft 19 do not rotate as a result of the first main shaft 11 not rotating, the air conditioner compressor 112 and the oil pump 122 are also not driven.

While the vehicle is coasting, the counter shaft 14 rotates in association with rotation of the drive shafts 9, 9, and the connecting shaft 13 is rotated by the third speed drive gear 23*a* which meshes with the first common driven gear 23*b* which is provided on the counter shaft 14. As has been described before, the connecting shaft 13 is provided so as to cover the periphery of the first main shaft 11 and rotatably relative to the first main shaft 11, and the carrier 36 of the planetary gear mechanism 30 is mounted integrally on the connecting shaft 13. Consequently, when the connecting shaft 13 continues to rotate with no lubrication implemented, the transmission 20 may be heated to high temperatures.

Then, in the hybrid vehicle driving system 1 of this embodiment, when the neutral position is selected while the vehicle is being driven, the first clutch 41 and the second clutch 42 are released, and thereafter, the first input shaft 11 is rotated to thereby drive the oil pump 122. By so doing, even when the neutral position is selected while the vehicle is being driven, the transmission 20 can be lubricated.

Figure 4:
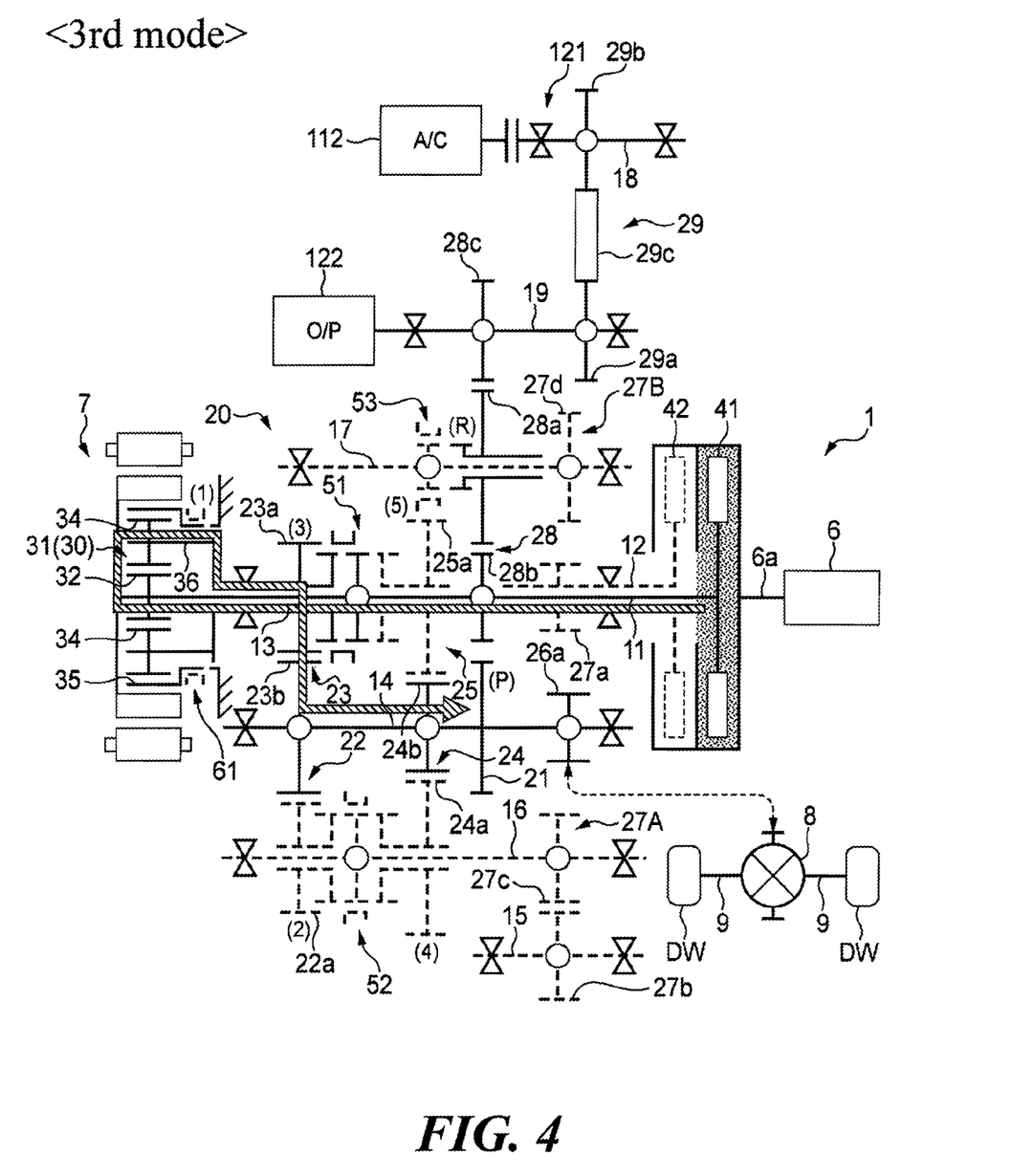
FIG. 4 shows a state in which torque is transmitted in a $3^{rd}$ mode in the hybrid vehicle driving system.

FIG. 4 shows a torque transmission state in the third speed driving (the $3^{rd}$ mode). As shown in FIG. 4, in the third speed driving, the first clutch 41 is applied, whereby the crankshaft 6*a* of the engine 6 is connected to the first main shaft 11. Then, the first gear change shifter 51 is engaged in the third speed engaging position, whereby the connecting shaft 13 mounted on the third speed gear 23*a* rotates together with the first main shaft 11. Consequently, the driving force generated by the engine 6 is transmitted from the first main shaft 11 to the driving wheels DW, DW by way of the third speed gear pair 23 (the third speed drive gear 23*a*, the first common driven gear 23*b*), the counter shaft 14, the final gear 26*a*, the differential gear mechanism 8, and the drive shafts 9, 9. As this occurs, the sun gear 32 which is mounted on the first main shaft 11 and the carrier 36 which is connected to the third speed drive gear 23*a* by the connecting shaft 13 rotate together, and the ring gear 35 also rotates together therewith, whereby the planetary gear mechanism 30 is made integral.

When a gear change is made to select the neutral position during the third speed driving, firstly, the first clutch 41 and the first gear change shifter 51 are released. Thereafter, electric power is supplied to the motor 7 by the PDU 2, whereby the rotor 72 of the motor 7 rotates, and the first main shaft 11 mounted on the rotor 72 rotates. Thus, since the oil pump 122 can be driven by the oil pump auxiliary shaft 19 which is rotated by the rotation of the first main shaft 11, the transmission 20 can be lubricated.

As this occurs, when the first main shaft 11 rotates at the same revolution speed as that of the connecting shaft 13, the friction between the first main shaft 11 and the connecting shaft 13 can preferably be reduced. Consequently, when the first main shaft is rotated by the motor 7 after the first clutch 41 and the first gear change shifter 51 have been released, the ECU 5 calculates the revolution speed of the third speed drive gear 23*a* from the vehicle speed and then controls the PDU 2 and the motor 7 so that the first main shaft 11 is rotated at the revolution speed so calculated. The first main shaft 11 and the connecting shaft 13 rotate together with each other during the third speed driving. Because of this, when the first main shaft is rotated by the motor 7 immediately after the neutral position has been selected to thereby release the first clutch 41 and the first gear change shifter 51, the revolution speeds of the first main shaft 11 and the third speed drive gear 23*a* can easily be synchronized with each other. As this occurs, the first main shaft 11 rotates at the same revolution speed as that of the carrier 36 of the planetary gear mechanism 30.

Figure 5:
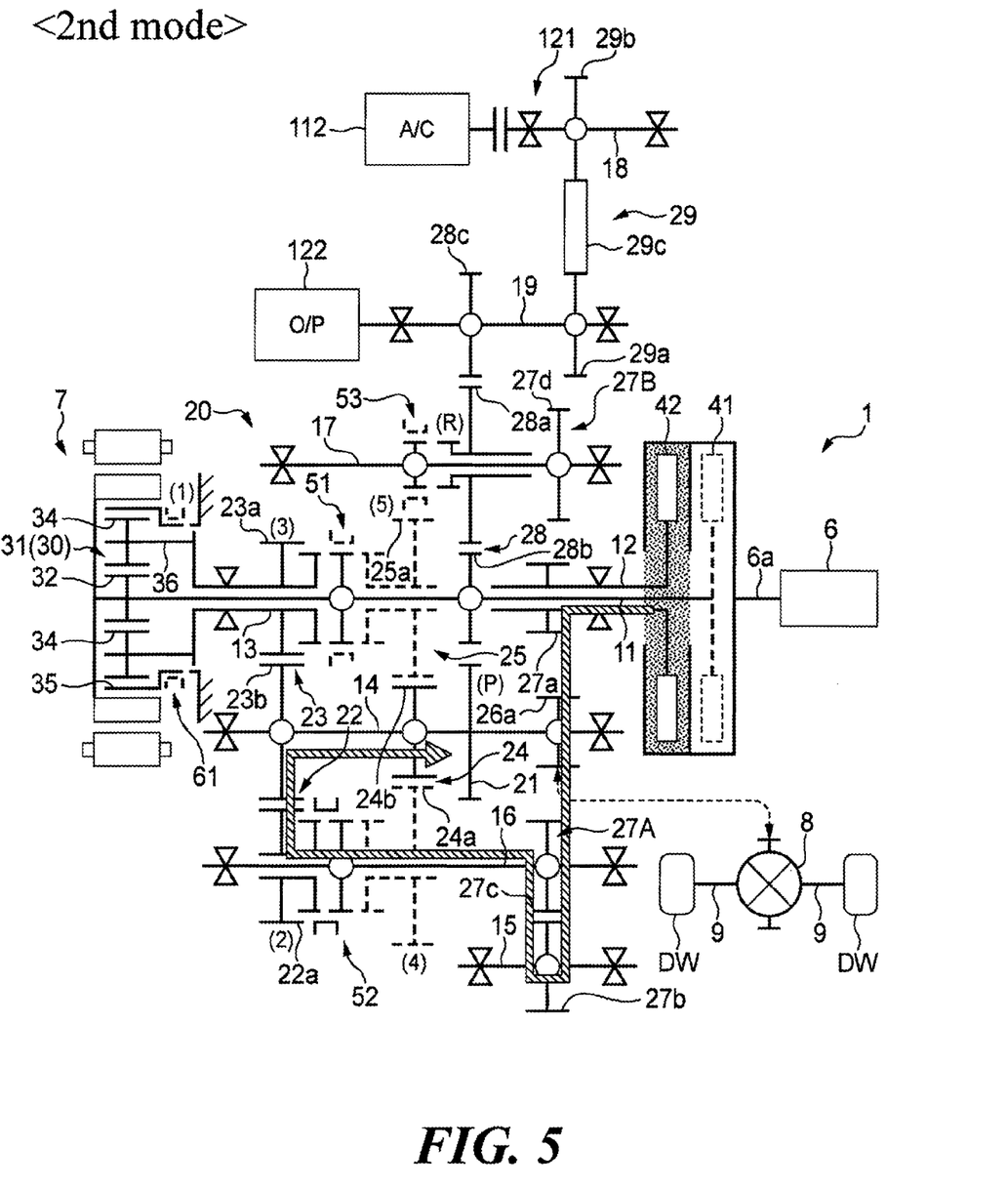
FIG. 5 shows a state in which torque is transmitted in a $2^{nd}$ mode in the hybrid vehicle driving system.

FIG. 5 shows a torque transmission state in the second speed driving (the $2^{nd}$ mode). As shown in FIG. 5, in the second speed driving, the second clutch 42 is applied, whereby the crankshaft 6*a* of the engine 6 is connected to the second main shaft 12. Then, the second gear change shifter 52 is engaged in the second speed connecting position, whereby the second speed drive gear 22*a* rotates together with the second intermediate shaft 16. Consequently, the driving force generated by the engine 6 is transmitted from the second main shaft 12 to the driving wheels DW, DW by way of the first idle gear train 27A (the idle drive gear 27*a*, the first idle driven gear 27*b*, the second idle driven gear 27*c*), the second intermediate shaft 16, the second speed gear pair 22 (the second speed drive gear 22*a*, the first common driven gear 23*b*), the counter shaft 14, the final gear 26*a*, the differential gear mechanism 8, and the drive shafts 9, 9.

Figure 6:
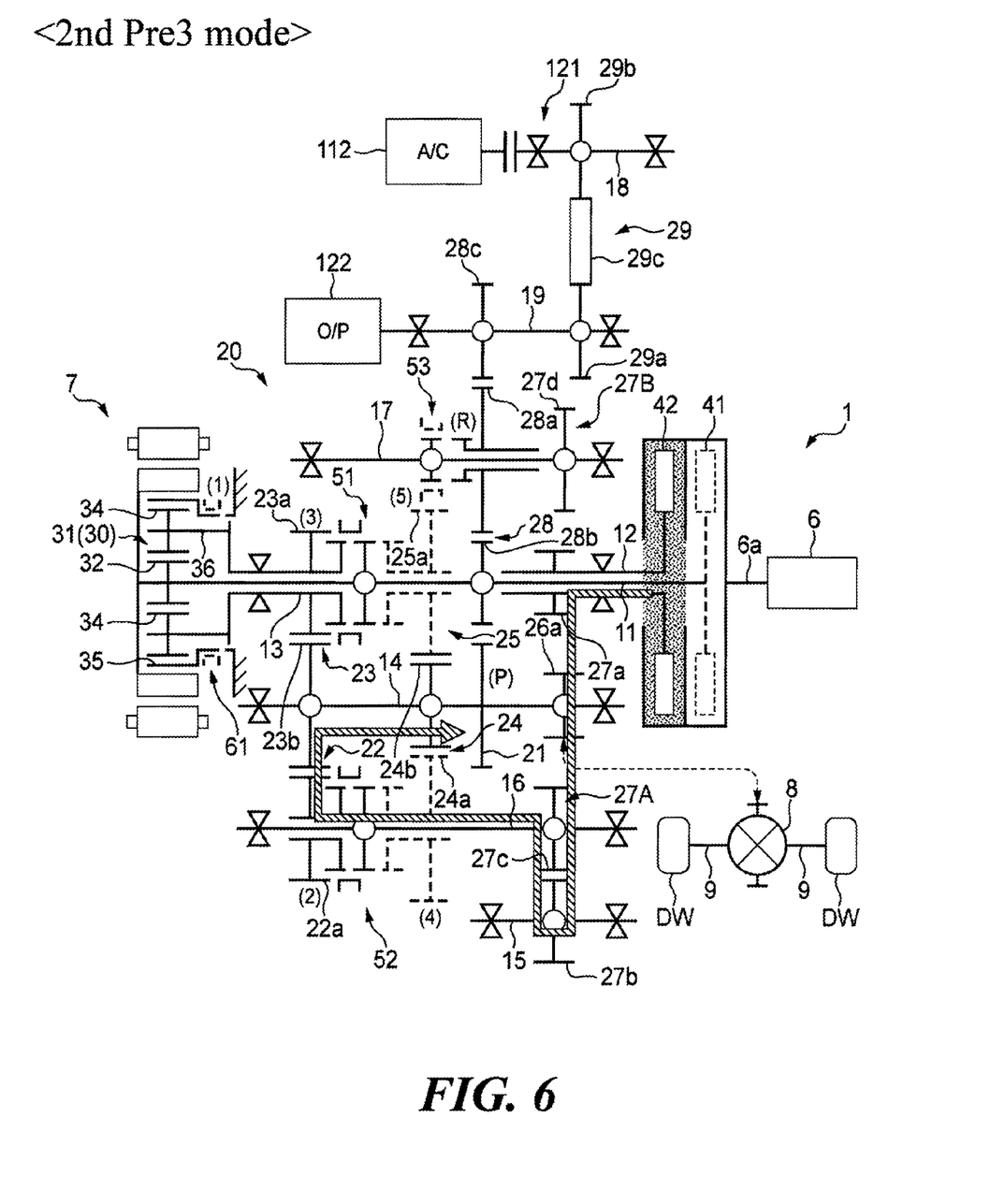
FIG. 6 shows a state in which torque is transmitted in a $2^{nd}$ pre-$3^{rd}$ mode in the hybrid vehicle driving system.

When the neutral position is selected during the second speed driving, firstly, the first gear change shifter 51 is engaged in the third speed engaging position before the second clutch 42 and the second gear change shifter 52 are released. Hereinafter, the state in which the first gear change shifter 51 is pre-shifted in the third speed engaging position during the second speed driving will be referred to as a $2^{nd}$ Pre3 mode. FIG. 6 shows a torque transmission state in the $2^{nd}$ Pre3 mode.

Here, since the first common driven gear 23*b* and the third speed drive gear 23*a* mesh with each other, the third speed drive gear 23*a* and the connecting shaft 13 are rotating even during the second speed driving. Consequently, when the first gear change shifter 51 is pre-shifted in the third speed engaging position, the third speed drive gear 23*a* and the connecting shaft 13 come to rotate together with the second main shaft 16. Thereafter, the second clutch 52 and the first and second gear change shifters 51, 52 are released. Thereafter, a lubricated state of the transmission 20 is determined by the lubricated state determination unit 55. When it is determined that the transmission 20 needs to be lubricated, electric power is supplied to the motor 7 by the PDU 2 so to rotate the rotor 72, whereby the first main shaft 11 rotates. The oil pump auxiliary shaft 19 is rotated by the rotation of the first main shaft 11 so as to drive the oil pump 122. Therefore, the transmission 20 can be lubricated.

In this way, by pre-shifting the first gear change shifter 51 in the third speed engaging position, the first main shaft 11 is rotating at the same revolution speed as that of the third speed drive gear 23*a*. Consequently, when the first main shaft 11 is rotated by the motor 7 immediately after the neutral position is selected to release the second clutch 42 and the first and second gear change shifters 51, 52, the revolution speeds of the first main shaft 11 and the third speed drive gear 23*a* can easily be synchronized with each other.

Figure 7:
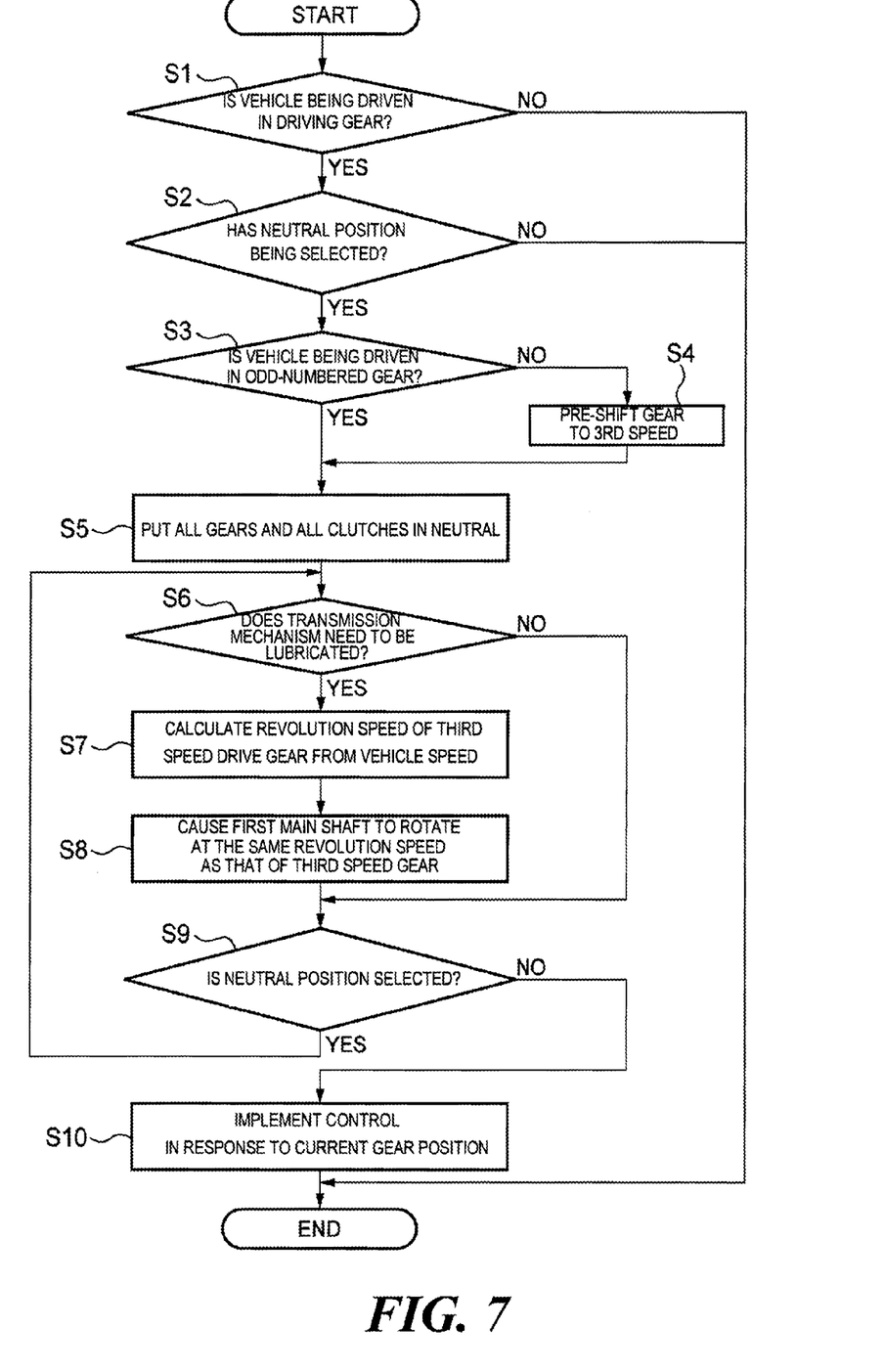
FIG. 7 shows a control of the hybrid vehicle driving system in FIG. 1.

FIG. 7 shows the operation of this embodiment. Firstly, the ECU 5 determines whether or not the vehicle is being driven (step S1). If the vehicle is not being driven, the flow ends. If the vehicle is being driven, then, the ECU 5 determines whether or not a shift position detected by the shift position detection unit 57 is the neutral position (step S2). If it is determined in step S2 that the neutral position has been selected, the ECU 5 determines whether or not the vehicle is being driven in an odd-numbered gear (step S3).

If it is determined in step S3 that the vehicle is not being driven in the odd-numbered gear, that is, if it is determined in step 3 that the vehicle is currently being driven with an even-numbered gear engaged, the ECU 5 pre-shifts the first gear change shifter 51 in the third speed engaging position (step S4). After having pre-shifted the first gear change shifter 51 in the third speed engaging position, the ECU 5 puts all the gears and all the clutches in neutral positions (step S5). Namely, the ECU 5 controls so that the second clutch 42 and the first and second gear change shifters 51, 52 are released. The ECU 5 also puts all the gears and all the clutches in the neutral positions also when it is determined in step S3 that the vehicle is currently being driven in an odd-numbered gear (step S5). Namely, the ECU 5 controls so that the first clutch 41 and the synchromesh mechanism 61 or the first gear change shifter 51 are released.

After all the gears and all the clutches have been put in the neutral positions, the lubricated state determination unit 55 determines whether or not the transmission 20 needs to be lubricated (step S6). If it is determined in step S6 that the transmission 20 needs to be lubricated, the ECU 5 calculates a revolution speed of the third speed drive gear 23a from the vehicle speed (step S7). The revolution speed of the third speed drive gear 23a can be calculated from the vehicle speed and the gear ratio of the third speed drive gear 23a. Then, the ECU 5 controls so that the first main shaft 11 is rotated at the same revolution speed as the revolution speed of the third speed drive gear 23a (step S8). Specifically, the ECU 5 controls so that electric power is supplied to the PDU 2 so as to drive the motor 7 to thereby drive to rotate the first main shaft 11 by means of rotation of the rotor 72 of the motor 7. The oil pump 122 can be driven by rotating the first main shaft 11 in this way, thereby lubricating the transmission 20.

According to the embodiment, even when the vehicle is driven in the even-numbered gears, the first main shaft 11 rotates together with the third speed drive gear 23a by pre-shifting the third speed drive gear 23a before all the gears and all the clutches are released. When the vehicle is driven in the odd-numbered gears before the neutral position is selected, the first main shaft 11 is driven to rotate. Consequently, when the first main shaft 11 is rotated immediately after all the gears and all the clutches are put in the neutral positions, the rotation of the first main shaft 11 can easily be synchronized with the rotation of the third speed drive gear 23a.

The above-described controls continue while the neutral position is kept selected. Consequently, after step S6 or if it is determined in step S6 that the transmission 20 does not need lubrication, the ECU 5 determines again whether or not the neutral position is selected (step S9). If the neutral position is held, the flow returns to step S6 where it is determined whether or not the transmission 20 needs lubrication. If it is determined in step S9 that the neutral position is no more selected, that is, if the driver changes gears from the neutral to the other gear positions, the ECU 5 implements a control matching the current gear position (step S10), and the control flow ends.

In this embodiment, the first main shaft 11 is still rotated by the motor 7 after the first and second clutches 41, 42 and the first and second gear change shifters 51, 52 have been released as a result of the neutral position having been selected. However, in place of this configuration, the first main shaft 11 may be rotated by the engine 6 by applying the first clutch 41 again.

In this embodiment, the lubricated state of the transmission 20 is determined after the first and second clutches 41, 42 and the first and second gear change shifters 51, 52 have been released as a result of the neutral position having been selected. However, the lubricated state of the transmission 20 may be determined before the first and second clutches 41, 42 and the first and second gear change shifters 51, 52 are released. When the neutral position is selected, the first main shaft 11 may be controlled so as to rotate at all times to implement the lubrication without making a determination of the lubricated state.

In this embodiment, while the oil pump 122 is made to lubricate the transmission 20 only, since the first main shaft 11 of the transmission 20 is connected to the motor 7, when the transmission 20 is heated to high temperatures, the motor 7 is also heated to high temperatures. Consequently, by providing a filter, a feed pump and piping, which are all not shown, in addition to the transmission 20, the motor 7 may be made to be lubricated and cooled. By providing the filter, the feed pump and the piping, after the transmission 20 is lubricated by the lubricant being discharged by the oil pump 122, the lubricant can be filtered and then discharged to the motor 7 by way of the piping by the feed pump. By so doing, the motor 7 can be lubricated and cooled.

Thus, according to the hybrid vehicle driving system 1 of this embodiment, even when the neutral position is selected during the driving of the vehicle, the oil pump 122 can be driven by rotating the first main shaft 11, and therefore, the lubricated state of the transmission 20 can be maintained well. The friction in the transmission 20 can be reduced in addition to the lubrication thereof by driving the oil pump 122 by causing the first main shaft 11 to rotate at the same revolution speed as that of the third speed drive gear 23a, thereby increasing the durability of the transmission 20. Even while the vehicle is being driven in the even-numbered gears, the revolution speed of the first input shaft can easily be made to coincide with the revolution speed of the third speed drive gear 23a. In addition to the lubrication of the transmission 20, the motor 7 can also be lubricated.

(Modified Example)

A modified example of the first embodiment will be described below. Although the configuration of this modified example is almost similar to that of the above-described embodiment, a control implemented while the vehicle is being driven in the even-numbered gears is different from the embodiment.

In this modified example, too, an oil pump 122 is provided on an oil pump auxiliary shaft 19 which is connected to a first main shaft 11. Consequently, when the vehicle is being driven in even-numbered gears by applying the second clutch 42 and engaging a second gear change shifter 52 in a second speed engaging position or a fourth speed engaging position, the first main shaft 11 does not rotate, and hence, the oil pump 122 is not driven. Therefore, the transmission 20 is not lubricated.

Then, in this modified example, while the vehicle is being driven in either of the even-numbered gears, when a lubricated state determination unit 55 determines that the transmission 20 needs lubrication, the gear is pre-shifted to either of odd-numbered gears, so as to rotate the first main shaft 11. Namely, by controlling so that a synchromesh mechanism 61 is engaged in a first speed engaging position or a first gear change shifter 51 is engaged in a third speed engaging position or a fifth speed engaging position, the gear is pre-shifted to a first speed, a third speed or a fifth speed. By so doing, the first main shaft 11 can be rotated, and therefore, the oil pump 122 can be driven even while the vehicle is being driven in the even-numbered gears, thereby lubricating the transmission 20.

In this modified example, too, an air conditioner compressor 112 can be driven by the first main shaft 11. When the vehicle is being driven in either of the even-numbered gears, the first main shaft 11 can be rotated by pre-shifting the gear to either of the odd-numbered gears. Therefore, even when the vehicle is being driven in the even-numbered gears, the air conditioner compressor 112 can be driven, thereby realizing a comfortable driving.

(Second Embodiment)

Figure 8:
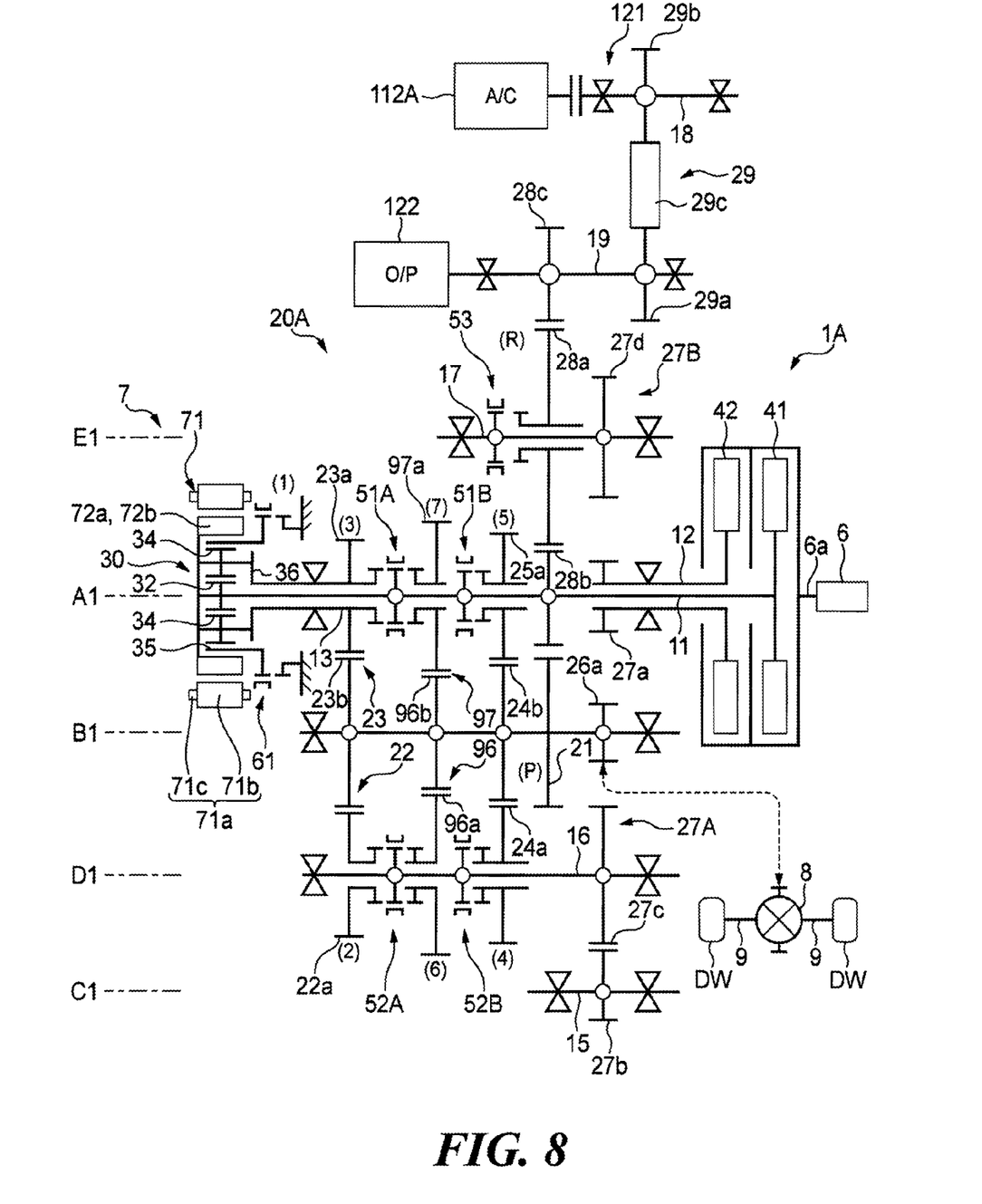
FIG. 8 cross-sectionally shows a hybrid vehicle driving system according to a second embodiment of the invention.

Next, a hybrid vehicle driving system of a second embodiment of the invention will be described by reference to FIG. 8. A hybrid vehicle driving system 1A differs from the hybrid vehicle driving system 1 in that a planetary gear mechanism 31 which makes up a differential reduction gear 30 and a sixth speed gear pair 96 and a seventh speed gear pair 97 in addition to second to fifth speed gear pairs 22 to 25 are provided in a transmission 20A. Hereinafter, the hybrid vehicle driving system 1A will be described with respect to only the features which are different from the hybrid vehicle driving system 1 that has been described before.

A seventh speed drive gear 97a, which is adapted to rotate relative to a first main shaft 11, is provided between a third speed drive gear 23a and a fifth speed drive gear 25a on the first main shaft 11. In addition, a first gear change shifter 51A, which is adapted to connect the first main shaft 11 with the third speed drive gear 23a or the fifth speed drive gear 25a or release the connection of the shaft with the drive gear, is provided between the third speed drive gear 23a and the seventh speed drive gear 97a. A third gear change shifter 51B, which is adapted to connect the first main shaft 11 with the fifth speed drive gear 25a or release the connection of the shaft with the drive gear, is provided between the seventh speed drive gear 97a and the fifth speed drive gear 25a on the first main shaft 11. Then, when the first gear shifter 51A is engaged in a third speed engaging position, the first main shaft 11 and the third speed drive gear 23a connected together so as to rotate together. When the first gear shifter 51A is engaged in a seventh speed engaging position, the first main shaft 11 and the seventh speed drive gear 97a are connected together so as to rotate together. When the first gear change shifter 51A is in a neutral position, the first main shaft 11 rotates relative to the third speed drive gear 23a and the seventh speed drive gear 97a. When the third gear change shifter 51B is engaged in a fifth speed engaging position, the first main shaft 11 and the fifth speed drive gear 25a are connected together so as to rotate together. When the third gear change shifter 51B is in a neutral position, the first main shaft 11 rotates relative to the fifth speed drive gear 25a.

A sixth speed drive gear 96a, which is adapted to rotate relative to a second intermediate shaft 16, is provided between a second speed drive gear 22a and a fourth speed drive gear 24a on the second intermediate shaft 16. In addition, a second gear change shifter 52A, which is adapted to connect the second intermediate shaft 16 with the second speed drive gear 22a or the sixth speed drive gear 96a or release the connection of the shaft with the drive gear, is provided between the second speed drive gear 22a and the sixth speed drive gear 96a on the second intermediate shaft 16. A fourth gear change shifter 52B, which is adapted to connect the second intermediate shaft 16 with the fourth speed drive gear 24a or release the connection of the shaft with the drive gear, is provided between the sixth speed drive gear 96a and the fourth speed drive gear 24a. Then, when the second gear change shifter 52A is engaged in a second speed engaging position, the second intermediate shaft 16 and the second speed drive gear 22a are connected together so as to rotate together. When the second gear change shifter 52A is engaged in a sixth speed engaging position, the second intermediate shaft 16 and the sixth speed drive gear 96a are allowed to rotate together. When the second gear change shifter 52A is in a neutral position, the second intermediate shaft 16 rotates relative to the second speed drive gear 22a and the sixth speed drive gear 96a. When the fourth gear change shifter 52B is engaged in a fourth speed engaging position, the second intermediate shaft 16 and the fourth speed drive gear 24a are connected together so as to rotate together. When the fourth gear change shifter 52B is in a neutral position, the second intermediate shaft 16 rotates relative to the fourth speed drive gear 24a.

A third common driven gear 96b is mounted integrally on a counter shaft 14 between a first common driven gear 23b and a second common driven gear 24b. Here, the third common driven gear 96b meshes with the seventh speed drive gear 97a which is provided on the first main shaft 11 to thereby make up a seventh speed gear pair 97 together with the seventh speed drive gear 97a and meshes with the sixth speed drive gear 96a which is provided on the second intermediate shaft 16 to thereby make up a sixth speed gear pair 96 together with the sixth speed drive gear 96a.

Then, a sixth speed driving can be implemented by engaging the second clutch 42 in such a state that the second gear change shifter 52A is engaged in a sixth speed engaging position. In addition, a seventh speed driving can be implemented by engaging the first clutch 41 in such a state that the first gear change shifter 51A is engaged in a seventh speed engaging position. In the sixth and seventh speed drivings, the motor 7 can be used to assist the drivings or to charge a battery.

In the second embodiment, too, an oil pump 122 is provided on an oil pump auxiliary shaft 19 so as to be connected to the first main shaft 11. Then, in the hybrid vehicle driving system 1A of the second embodiment, too, when the neutral position is selected while the vehicle is being driven, the first clutch 41 and the second clutch 42 are both released, and thereafter, the first input shaft 11 is rotated again to thereby drive the oil pump 122 so as to lubricate the transmission 20A.

The invention is not limited to the above-described embodiments and can be modified or improved without departing from a scope of the invention that is defined by appended claims. For example, in the hybrid vehicle driving system 1, the odd-numbered gears are disposed on the first main shaft 11 which is the input shaft to which the motor 7 of the double-clutch type transmission is connected, while the even-numbered gears are disposed on the second intermediate shaft 16 which is the input shaft to which the motor 7 is not connected. However, the invention is not limited thereto, and hence, a configuration may be adopted in which the even-numbered gears are disposed on the first main shaft 11 to which the motor 7 is connected, while the odd-numbered gears are disposed on the second intermediate shaft 16 to which the motor 7 is not connected, and controls matching the configuration are implemented.

In addition to the planetary gear mechanism 30, the third speed drive gear 23a, the fifth speed drive gear 25a and the seventh speed drive gear 97a, ninth, eleventh . . . speed gears may be provided as odd-numbered gears, while in addition to the second speed drive gear 22a, the fourth speed drive gear 24a, and the sixth speed drive gear 96a, eighth, tenth . . . speed gears may be provided as even-numbered gears.

This patent application is based on Japanese Patent Application (No. 2010-081006) filed on Mar. 31, 2010, the contents of which are incorporated herein by reference.

Description of Reference Numerals

1, 1A Hybrid vehicle driving system; 3 Battery (Battery); 5 ECU; 6 Engine (Internal combustion engine); 7 Motor (Electric motor); 11 First main shaft (First input shaft); 14 Counter shaft (Output shaft); 16 Second intermediate shaft (Second input shaft); 20 Transmission; 41 First clutch (First engaging and disengaging means); 42 Second clutch (Second engaging and disengaging means); 51 First gear change shifter; 52 Second gear change shifter; 55 Lubricated state determination unit; 57 Shift position detection unit; 112 Air conditioner compressor; 122 Oil pump (Lubrication Pump).

The invention claimed is:

1. A hybrid vehicle driving system to be used in a hybrid vehicle which utilizes an internal combustion engine and an electric motor as drive sources, the hybrid vehicle driving system including:
   a transmission having:
      a first transmission mechanism in which mechanical driving force from an output shaft of the internal combustion engine and the electric motor is received by a first input shaft which is in engagement with the electric motor so as to put any of plural gears in an engaged state to thereby bring the first input shaft and driving wheels into engagement with each other;
      a second transmission mechanism in which the mechanical driving force from the output shaft of the internal combustion engine is received by a second input shaft so as to put any of plural gears in an engaged state to thereby bring the second input shaft and the driving wheels into engagement with each other;
      a first engaging and disengaging unit which can bring the output shaft of the internal combustion engine and the first input shaft into engagement with each other; and
      a second engaging and disengaging unit which can bring the output shaft of the internal combustion engine and the second input shaft into engagement with each other,
   a lubrication pump which is connected to the first input shaft to thereby implement the lubrication of the transmission; and
   a lubricated state determination unit which determines a lubricated state of the transmission,
   wherein, when the lubricated state determination unit determines that lubrication is necessary, the lubrication pump is driven by rotating the first input shaft by the electric motor, or the lubrication pump is driven by rotating the first input shaft by the internal combustion engine by engaging the first engaging and disengaging unit.

2. The hybrid vehicle driving system of claim 1, further including:
   a shift position detection unit which detects a shift position selected by the user,
   wherein the transmission further has:
      a first synchromesh unit which puts any of the plural gears in an engaged state so as to bring the first input shaft and the driving wheels into engagement with each other; and
      a second synchromesh unit which puts any of the plural gears in an engaged state so as to bring the second input shaft and the driving wheels into engagement with each other,
   wherein, when a neutral position is selected while the vehicle is being driven, the first engaging and disengaging unit, the second engaging and disengaging unit, the first synchromesh unit and the second synchromesh unit are disengaged, and thereafter, the lubricated state of the transmission is determined by the lubricated state determination unit, and
   wherein, when the lubricated state determination unit determines that lubrication is necessary, the first input shaft is rotated by the electric motor to thereby drive the lubrication pump, or the first input shaft is rotated by the internal combustion engine by engaging the first engaging and disengaging unit to thereby drive the lubrication pump.

3. The hybrid vehicle driving system of claim 2, further including:
   a third speed gear for a third speed which is provided on the first input shaft so as to be rotated in association with rotation of an output shaft which transmits power to the driving wheels,
   wherein a revolution speed of the third speed gear is calculated based on a vehicle speed of the vehicle which is being driven, so that the first input shaft is rotated at the same revolution speed as the revolution speed of the third speed gear.

4. The hybrid vehicle driving system of claim 1,
   wherein, when the lubricated state determination unit determines that lubrication is necessary while the vehicle is being driven in any of the plural gears provided on the second input shaft, the gear is pre-shifted to any of the plural gears which are provided on the first input shaft.

5. The hybrid vehicle driving system of claim 1,
   wherein the electric motor can be cooled by driving the lubrication pump.

6. The hybrid vehicle driving system of claim 1,
   wherein, while the vehicle is being driven in any of the plural gears which are provided on the second input shaft, the gear is pre-shifted to any of the plural gears which are provided on the first input shaft so as to rotate the first input shaft to thereby drive the lubrication pump.

7. The hybrid vehicle driving system of claim 1, further including:
   an air conditioner which can be driven by the first input shaft.

8. The hybrid vehicle driving system of claim 2, further including:
   an air conditioner which can be driven by the first input shaft.

9. The hybrid vehicle driving system of claim 3, further including:
   an air conditioner which can be driven by the first input shaft.

10. The hybrid vehicle driving system of claim 4, further including:
    an air conditioner which can be driven by the first input shaft.

11. The hybrid vehicle driving system of claim 5, further including:
    an air conditioner which can be driven by the first input shaft.

12. The hybrid vehicle driving system of claim 6, further including:
    an air conditioner which can be driven by the first input shaft.

* * * * *